FRANK P. FINK, Inventor

By George W. Reiber, Attorney

Patented July 25, 1950

2,516,377

UNITED STATES PATENT OFFICE 2,516,377

INDIRECT LIGHTING PROJECTOR PRODUCING TRANSVERSELY ELONGATED LIGHT BEAMS

Frank P. Fink, Valley Stream, N. Y.

Application May 22, 1946, Serial No. 671,497

6 Claims. (Cl. 240—41.1)

This invention relates generally to reflectors and more particularly to those which produce transversely elongated beams.

Generally, reflectors used with a small unit ray-emitting source are of the paraboloidal surface type, and cast a beam substantially circular in cross section. Such reflectors are used in directing light, heat, infrared and other rays. The customary automobile headlight is of this circular beam reflector type and will be used as an example to illustrate the distinction and advantages of the present invention over such prior art.

The circular beam of the customary headlight throws many rays from the upper part of the reflector which cause disturbing glare on the eyes of the operator of an oncoming car. It also casts many unessential rays from the lower part of the reflector which have incidence with the road close to the headlight and are reflected sharply upward from a wet pavement or the like to cause additional glare and annoyance to the operator of the oncoming car without giving benefit to the operator of the offending car.

The present invention will provide a beam, transversely elongated so that the upper and lower rays abovementioned are reduced and the illumination is spread in a relatively wider clearly defined beam having substantially no glare and providing better lateral illumination of the road.

Another object of the invention is the provision of a pair of cooperating reflectors, one of which distributes the radiations from a single source of light, heat or the like through a focal axis.

A further object of the invention is the projection of radiations in a beam of wholly reflected rays. Such rays are readily subdued by polarizing glass in lenses or windshields so that stray radiations, if any, may be the more easily made undisturbing to the eyes of motorists who use such protective means.

Still another object is the utilization of the reflector system of the present invention to produce a non-glaring headlight for automobiles and the like whereby the safety, pleasure and efficiency of night driving are increased.

Many additional objects and advantages of the invention will be apparent as the following description of a preferred embodiment of the invention is read in connection with the accompanying drawings.

Referring to the drawings.

For purposes of illustration, the drawings show the invention embodied in an automobile headlight whereby the annoyance and hazard of glare on the eyes of a passing driver is entirely eliminated or minimized to a degree which is conductive to safe and pleasant driving.

The headlight, indicated generally by the numeral 10, comprises principally a primary elliptic paraboloid-ellipsoidal reflector 11, a secondary elongated concave reflector 12 and a light source or lamp 13.

The term "elliptic paraboloid-ellipsoidal" is used to express as closely as possible the shape of the primary reflector 11.

Figure 3:
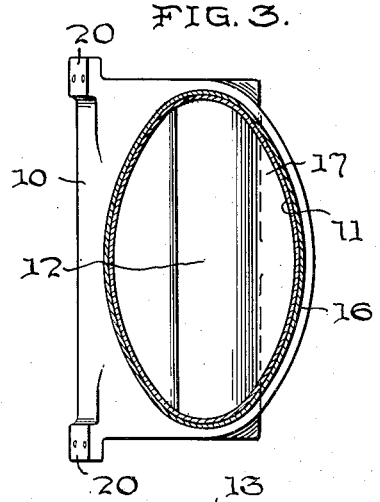
Fig. 3 is a transverse section taken on the plane indicated by the line 3—3 in Fig. 2.
Figure 2:
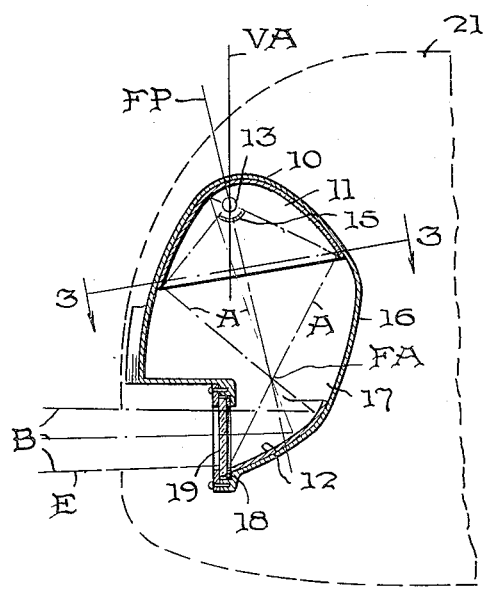
Fig. 2 is a longitudinal section taken on the plane indicated by the line 2—2 in Fig. 1.

As shown in Fig. 3, sections through this reflector taken normal to a longitudinal plane FP, passed through the light source 13 and a focal axis FA of the reflector 11 (Fig. 2), are substantially elliptical. A section of this reflector shown in Fig. 3 is also elliptical as are other parallel sections taken normal to the major axis of the elliptical section of Fig. 3. In Fig. 2, the source 13 is located at one focus point of the ellipse and the other focus point lies on the focal axis, FA. Both focii lie in the plane FP. This plane is shown in Fig. 2 as lying at an acute angle to the vertical axis, VA, of the headlight. The invention is not intended to be limited to such an arrangement of parts. For instance, this angle may be greater or less than that shown and in some forms of the invention the vertical axis VA may lie in the plane FP.

Figure 1:
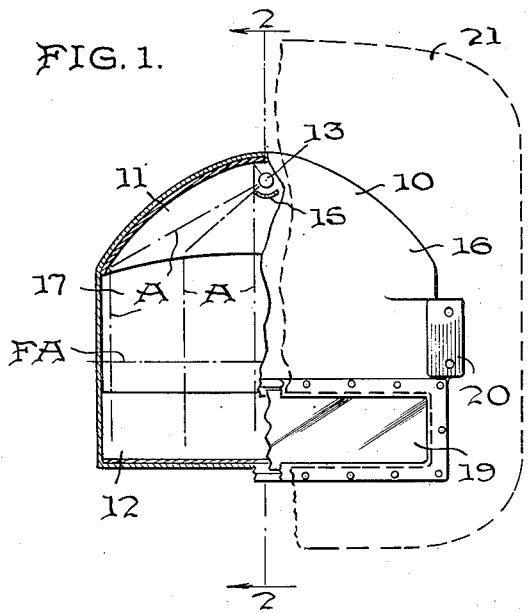
Fig. 1 is a front elevational view of a headlight embodying my invention, parts being broken away to facilitate description.
Figure 4:
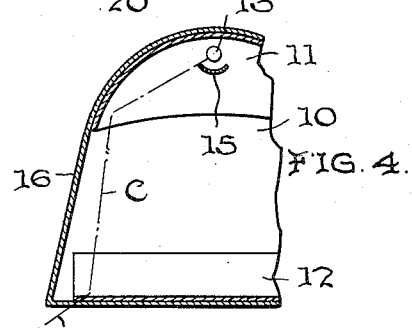
Figs. 4 and 5 are sections showing modifications of the headlight and reflector system shown in Fig. 1, and are taken on the same plane as that of the sectioned portion of Fig. 1.
Figure 5:
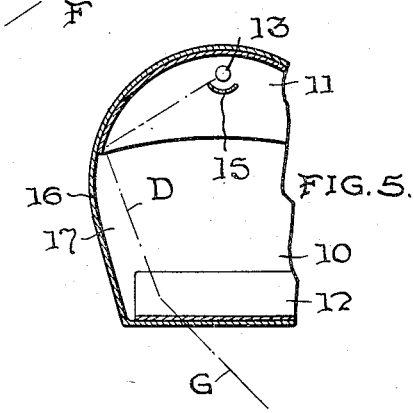

Parallel sections taken normal to the minor axis of the reflector section shown in Fig. 3 are substantially parabolical as indicated in Figs. 1, 4 and 5.

The surface of primary reflector 11 may also be described as all or part of that surface formed by variable parallel ellipses following as directrices a partial ellipse on the plane of the minor axes, and a parabola on the major axes of the said parallel ellipses.

This surface 11 will reflect rays from source 13. These reflected rays, indicated at A, A, intersect substantially on the focal axis FA as shown in Fig. 2, but they will be substantially parallel, one to the other, when viewed as in Fig. 1. However, in some adaptations of the invention the surface 11 may be formed so that the rays reflected therefrom will diverge as indicated at C in Fig. 4, or converge as at D in Fig. 5.

When reflected from the secondary reflector 12, the rays from primary reflector 11 are directed laterally of plane FP in substantially parallel relationship as indicated at B, B in Fig. 2 to form a transversely elongated beam E of wholly reflected light. Obviously, reflector 12 may be so shaped that rays reflected therefrom may diverge as shown at F in Fig. 4, or converge as at G in Fig. 5.

Some light from source 13 is not directed toward the primary surface 11, but is directed toward the secondary surface 12 and other surfaces within the shell. To utilize this random light and avoid incidental inequality of illumination in the beam E, a random ray reflecting surface 15 may be provided on or adjacent the lamp 13.

This surface 15 may be omitted entirely in such adaptations of my invention where the random rays do not appreciably affect the beam emanating from the reflector system. Or, the surface 15 may be non-reflecting in whole or in part to attain an ideal beam from the system.

The primary and secondary reflectors are shown mounted in a hood or shell 16 but they may be integral, suitably plated and/or polished parts or areas of the shell 16. The area 17 between the reflecting surfaces is preferably, but need not be, totally reflecting. The whole interior of the shell 16 may be sealed in any suitable known manner, as by a gasket 18, and a plain or polarizing glass window 19.

Lugs 20 may be formed on the shell and the headlight 10 thereby secured to an automobile fender 21 in any desired manner.

I have described my invention as adapted to an automobile headlight but it is readily adaptable to many other purposes. For instance, the reflector 11, with or without one or both surfaces 12 and 15, may be used to reflect radiant energy such as heat, infrared rays and the like in therapeutical or other devices to spread the rays over the body or other surface in an area transversely elongated relative to the beam.

It is believed that the invention and many of its advantages will be understood from the foregoing description, and that numerous changes may be made in the form, construction and arrangement of the parts within the spirit and scope of the invention, the form hereinabove described being merely a preferred embodiment thereof.

I claim:

1. An automobile headlight comprising a primary elliptic paraboloid-ellipsoidal reflector, said primary reflector having a focus point and a focal axis lying in a longitudinal plane, each section of said primary reflector taken normal to said longitudinal plane being substantially an ellipse with its major axis also lying in said longitudinal plane, a light source at said focus point and a secondary reflector located beyond said focal axis of said primary reflector adapted to reflect the rays from said primary reflector in a transversely elongated beam and in a direction at substantially right angles to said longitudinal plane.

2. An automobile headlight comprising a shell, a primary elliptic paraboloid-ellipsoidal reflector in one end thereof, said primary reflector having a focus point and a focal axis lying in a longitudinal plane, each section of said primary reflector taken normal to said longitudinal plane being substantially an ellipse with its major axis also lying in said longitudinal plane, a secondary reflector in the opposite end of said shell adapted to receive rays reflected thereto by said primary reflector from a light source at said focus point through said focal axis, and to direct said rays laterally of said longitudinal plane in a transversely elongated beam.

3. An automobile headlight comprising a shell, a primary elliptic paraboloid-ellipsoidal reflector in one end of said shell, said primary reflector having a focus point and a focal axis lying in a longitudinal plane, each section of said primary reflector taken normal to said longitudinal plane being substantially an ellipse with its major axis also lying in said longitudinal plane, a light source at said focus point, a cylindro-concave reflector mounted in the opposite end of said shell beyond said focal axis and adapted to deflect the light rays laterally of the longitudinal plane in a transversely elongated beam.

4. An automobile headlight as characterized in claim 3 provided with a random ray reflector adjacent said source to throw back upon said elliptic reflector all rays not directly cast upon it from said source.

5. An automobile headlight as characterized in claim 3 provided with a light absorbing surface adjacent said source to absorb substantially all rays from said source not cast directly upon said elliptic reflector.

6. In a reflector system, the combination of a primary elliptic paraboloid-ellipsoidal reflector having a focal point and a focal axis lying in a longitudinal plane, the major axes of all transverse sections of said reflector lying in a plane coincident with said longitudinal plane, said axes being also parallel with said focal axis, and a secondary reflector disposed beyond said focal axis to receive rays from said primary reflector passed through said axis and to reflect them laterally at substantially right angles to said longitudinal plane.

FRANK P. FINK.

REFERENCES CITED

The following references are of record in the file of this patent:

UNITED STATES PATENTS

| Number | Name | Date |
|---|---|---|
| 1,201,276 | Destremps | Oct. 17, 1916 |
| 1,238,483 | Benjamin | Aug. 28, 1917 |
| 1,300,202 | Stubblefield | Apr. 8, 1919 |
| 1,336,967 | Laird | Apr. 13, 1920 |
| 1,485,970 | Elder | Mar. 4, 1924 |
| 1,763,630 | Hopkins | June 10, 1930 |
| 1,855,867 | Pearse | Apr. 26, 1932 |
| 1,981,328 | Rivier | Nov. 20, 1934 |
| 2,004,831 | Rice | June 11, 1935 |

FOREIGN PATENTS

| Number | Country | Date |
|---|---|---|
| 219,001 | England | July 2, 1925 |